(12) United States Patent
Pasha et al.

(10) Patent No.: US 7,647,957 B2
(45) Date of Patent: Jan. 19, 2010

(54) **METHOD FOR MAKING PLYWOOD AND DIMENSIONAL LUMBER FROM *ARUNDO DONAX* L. OR BAMBOO**

(75) Inventors: Rasul Pasha, Seattle, WA (US); Abdulnaser Abdulmalik, Seattle, WA (US)

(73) Assignee: Infinity Board, LLC, Seattle, WA (US)

( * ) Notice: Subject to any disclaimer, the term of this patent is extended or adjusted under 35 U.S.C. 154(b) by 588 days.

(21) Appl. No.: 11/566,742

(22) Filed: Dec. 5, 2006

(65) Prior Publication Data

US 2007/0125446 A1 Jun. 7, 2007

Related U.S. Application Data

(60) Provisional application No. 60/597,495, filed on Dec. 5, 2005.

(51) Int. Cl.
*B27G 1/00* (2006.01)
*B27G 11/00* (2006.01)
*B27J 1/00* (2006.01)

(52) U.S. Cl. .................. 144/332; 144/333; 144/346

(58) Field of Classification Search ............... 144/332, 144/333, 344–346
See application file for complete search history.

(56) References Cited

U.S. PATENT DOCUMENTS

| 3,643,710 | A | | 2/1972 | Fitzgibbon | |
|---|---|---|---|---|---|
| 4,810,551 | A | * | 3/1989 | Chu | 428/106 |
| 5,786,063 | A | * | 7/1998 | Shibusawa et al. | 428/107 |
| 5,814,170 | A | * | 9/1998 | Shibusawa et al. | 156/62.2 |
| 7,021,346 | B2 | * | 4/2006 | Chang | 144/333 |

* cited by examiner

*Primary Examiner*—Shelley Self
(74) *Attorney, Agent, or Firm*—Pai Patent & Trademark Law Firm; Chao-Chang David Pai; Ian Graham Clapp

(57) ABSTRACT

A method of producing a virtually fireproof plywood from perennial grasses such as *Arundo donax* Ligneous, various bamboo strains, or a blend thereof, by first weaving the stalks of these plants into a mat and then layering these mats and binding each layer with any one of several commercial resins mixed with potash for the purpose of enhancing the board's fire retardant quality. The result is the formation of a finished product with structural board attributes and an exceptionally high flash point in relation to other manufactured board products made from forest materials.

20 Claims, 11 Drawing Sheets

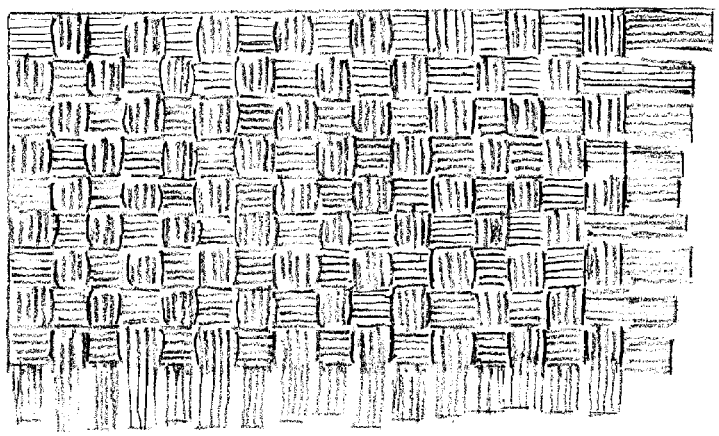
FIG. 8.
FIG. 9.
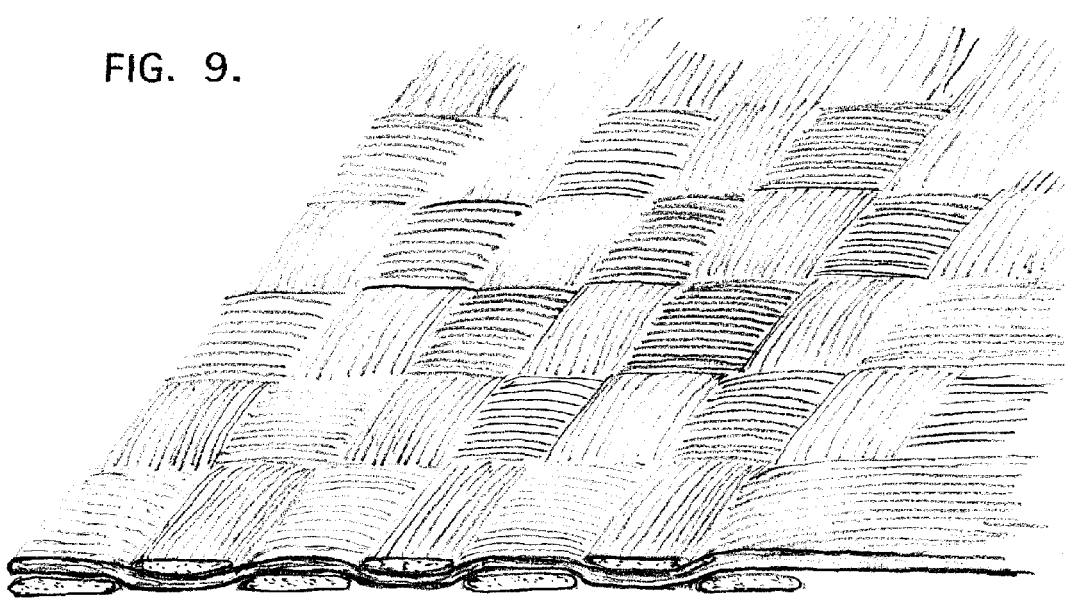

METHOD FOR MAKING PLYWOOD AND DIMENSIONAL LUMBER FROM *ARUNDO DONAX* L. OR BAMBOO

CROSS-REFERENCE TO RELATED APPLICATIONS

This application claims the benefit of U.S. Provisional Application No. 60/597,495, filed Dec. 5, 2005, which is now pending and is incorporated herein by reference.

BACKGROUND OF THE INVENTION

1. Field of the Invention

The present invention relates generally to a method of making plywood from *Arundo donax* Ligneous (*Arundo donax* L.) or bamboo stalk that has been split longitudinally, divided into relatively even sections and then split into one or more layers of substantially equal thickness making for a more pliable material that can be woven into mats. Several of these mats are then layered and bonded to form plywood using an adhesive comprising resins and potash.

2. Description of the Related Art

Until now, *Arundo donax* or bamboo plywood has not been manufactured or marketed for structural material purposes due primarily to a lack of a cost-effective processing technique and the fact that, to a great extent, structural board and structural dimensional lumber are products that have been deemed incompatible with the cultures in localities where *Arundo donax* or bamboo growth is indigenous. Excluding North America, much of Europe and Japan, structural building materials have primarily been made from clay and cement block.

The use of *Arundo donax* or bamboo for production of board as a building construction material has yet to become popular in the United States for a host of reasons. Principally, with the large number of forests dotting the North American continent, the abundance of trees as a natural resource has supplied ample materials to feed the construction industry. Hence the technology for processing this raw material has greatly dominated the board industry for over 200 years and still prevails to this day.

The first and last American innovation of significance for bamboo board production was developed in the early 1970's. It was a method and machine for the making of bamboo veneer. Partially due to the relatively high cost of production (machine and equipment designs were in their infancy stage and resin choices were limited) along with the unavailability of base raw materials, this unique concept appeared impractical to the US market. Though *Arundo donax* and bamboo woods have rather significant inherent advantages over most other types of wood to the end user, including a much higher resistance to moisture, markets where the materials are indigenous have been far more receptive to value-added *Arundo donax* and bamboo products.

Over the last 12 to 15 years, different parts of Asia (namely Taiwan, Indonesia and Vietnam) have experimented with bamboo board production for non-structural applications.

One method involves splitting or quartering bamboo stalk in order to straighten the diameter curve of the linear stalk using heat and moisture. The stalks are then milled into uniform pieces and glued together by a mechanical press. This method produces an aesthetically attractive board product that is singled-layered and is commonly used for finished flooring.

More recently, in Asia, is the development of the technique of weaving bamboo stalks into mats. The mats are then layered and pressed into a board three mats or more thick (essentially producing a bamboo plywood) for the purposes of making strong yet light weight, stackable crates for the fishing industry. Recently in Vietnam, developers have been experimenting with layered bamboo mat board as a material for forming concrete.

Throughout the developing world, structural materials are usually made from cement/concrete, reinforced concrete or, for bigger-budget projects, steel. Value-added bamboo products are generally used for decorative purposes. However, many wood technologists recognize (even if only conceptually) that *Arundo donax* and most strains of bamboo, when processed into panels, yield a product of higher Internal Bond, Modulus of Rupture, and Modulus of Elasticity than the structural boards currently manufactured from soft woods in the United States today.

As the building construction industry in America continues to embrace panelization (prefabrication of wall systems in factory settings providing for greater on-site efficiencies), highly efficient materials such as *Arundo donax* and various strains of bamboo offer an attractive alternative to conventional wood from trees. *Arundo donax* and bamboo plants are classified as perennial grasses and therefore count as a renewable resource. Many areas in the southern U.S. are capable of large scale *Arundo donax* and bamboo production.

As global pressures continue to influence prices of structural board in the US, many developing countries are beginning to realize that they cannot solve twenty-first century housing shortages with eighteenth century (and older) technology: i.e., brick and mortar. Currently, wood composite board manufacturing plants are being set up in several Latin American countries including Mexico, Venezuela, and Brazil utilizing soft woods from forests, which are relatively scarce outside of North America, Russia, and northern China. Unlike in the Asian countries, little if any commercial development of *Arundo donax* or bamboo is being considered in Latin America and Africa, even though *Arundo donax* and bamboo are readily available.

Recent refinements in resins and techniques for plywood production in the US, improving cost efficiencies, are directly transferable to *Arundo donax* and bamboo layering. With the innovation of adding cost-efficient nanoscience technology and materials to substantially enhance fire retarding qualities, *Arundo donax* and various strains of bamboo suitable for plywood production are poised to have a significant impact as the next generation of structural building material for sustainable development.

SUMMARY OF THE INVENTION

The invention contemplates a method for making virtually fireproof plywood and dimensional lumber products from *Arundo donax* Ligneous and/or a variety of bamboo strains by employing nano-science materials (specifically potash) to be mixed into the resins used for binding the layers of the plyboard and board-like products together.

A primary objective of the invention is to provide an improved method for making an environmentally agreeable structural plywood that satisfies the need for sustainable, highly fire-retardant and insect-repellent materials for the building construction industry, thereby lessening dependency on building products made from trees.

Another objective the inventors contemplate is to provide an oriented strand dimensional lumber product such as the standard American 2×4's and 2×6's, etc. with all of the inherent advantages of *Arundo donax* or bamboo.

The combination of both structural board and dimensional lumber made from green materials utilizing this innovative method meets the objective of the inventors to provide a "total green" building system.

These materials are ultimately designed as structural board and dimensional lumber products, but may also be used for other construction purposes which are non-structural in nature and in various other industries where they may be beneficial. An example is the marine industry because the raw stock (*Arundo donax* or bamboo) is highly water repellent.

Yet another objective of this invention is to provide a cost effective material superior in performance to wood for the manufacture of engineered building products such as I-beams, laminated beams, roof truss and forming materials for concrete.

Still another objective is to satisfy the need for long-lived building and consumer products such as non-structural panels for wall dividers, temporary dividers, cabinets, countertops, cutting boards, furniture, shelving, tabletops, packaging and crates, pallets, window frames, furring materials and finish flooring panels for decoration.

BRIEF DESCRIPTION OF THE DRAWINGS

The novel features of the invention as to its organization and method will be best understood when read in conjunction with the embodied drawings, wherein:

FIG. 8 is a plan view of perpendicular orientation of mat strands;

FIG. 9 shows a sectional view depicting 3-D orientation of strands;

DETAILED DESCRIPTION OF THE PREFERRED EMBODIMENTS

Figure 1:
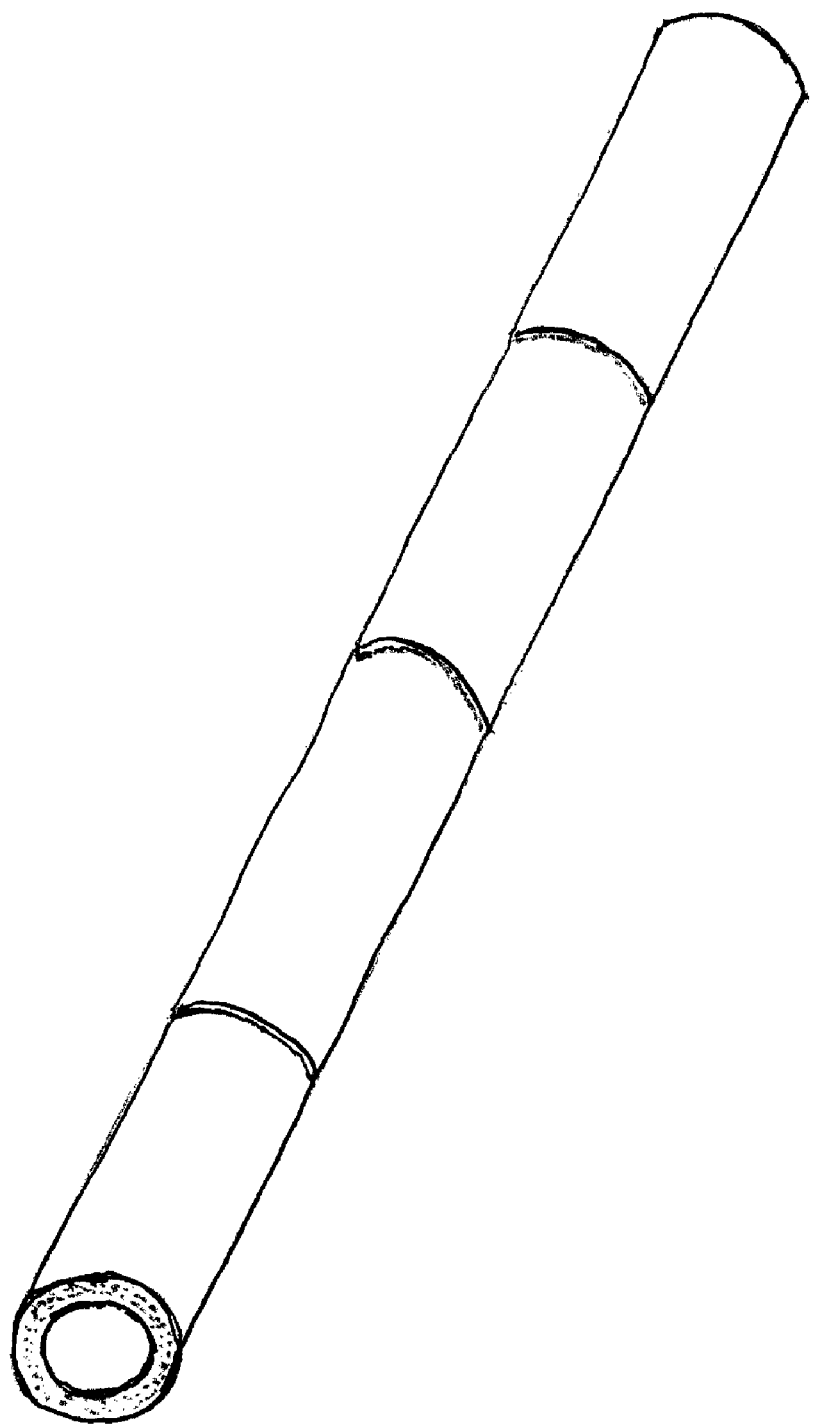
FIG. 1 illustrates representative bamboo or *Arundo donax* as the base stalk material of the invention.

The first step of this method for making *Arundo donax* or bamboo plywood is to select and cut mature *Arundo donax* L. or bamboo from cultivated plantations or wild growth forest and then remove the green husk, leaves and stems from the stalk in an efficient manner. At this time most of the outer knuckles or joints on the stalk are removed by cutting or grinding (see FIG. 1).

Figure 2:
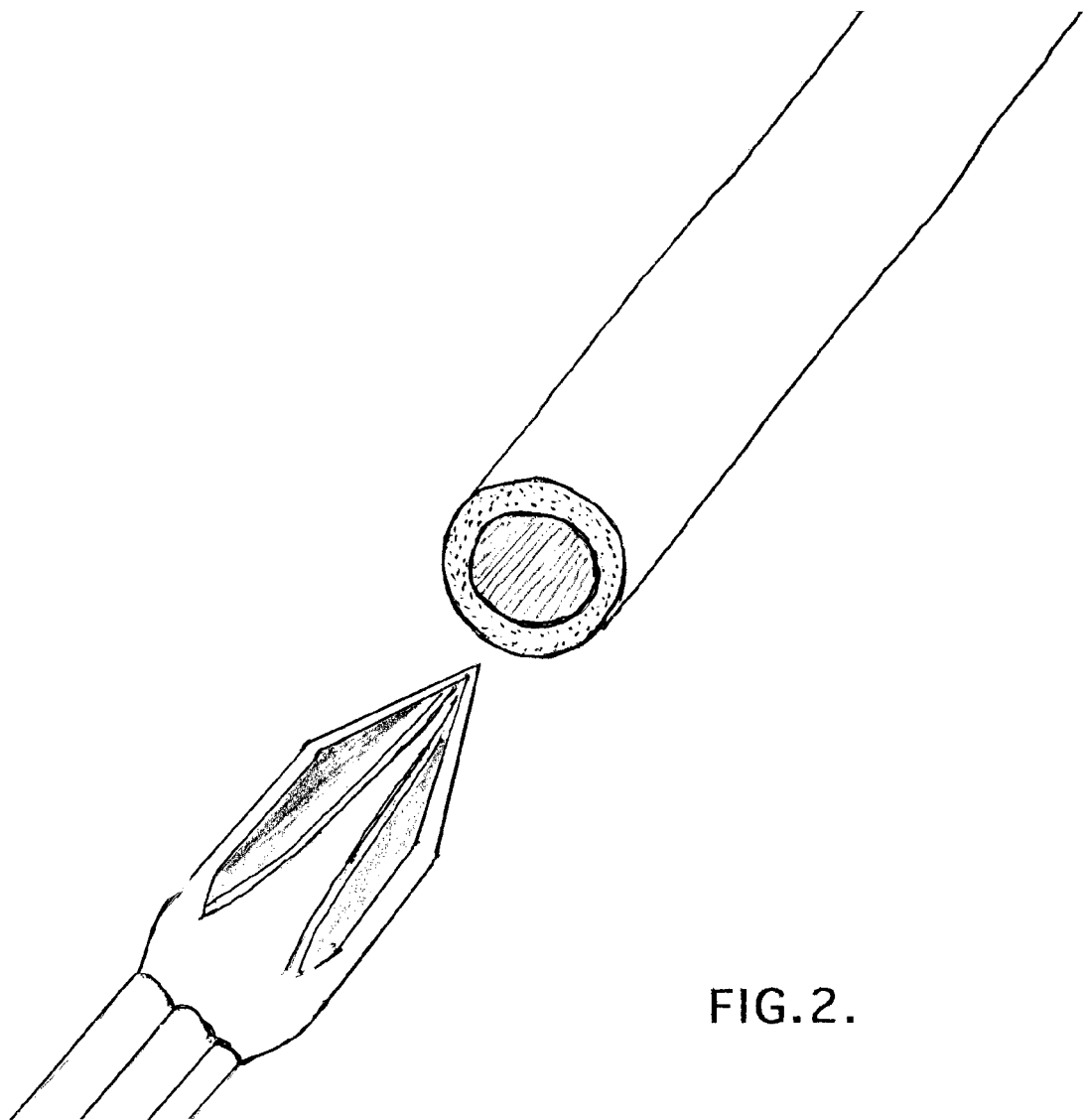
FIG. 2 shows the device used for splitting the stalk for production.
Figure 3:
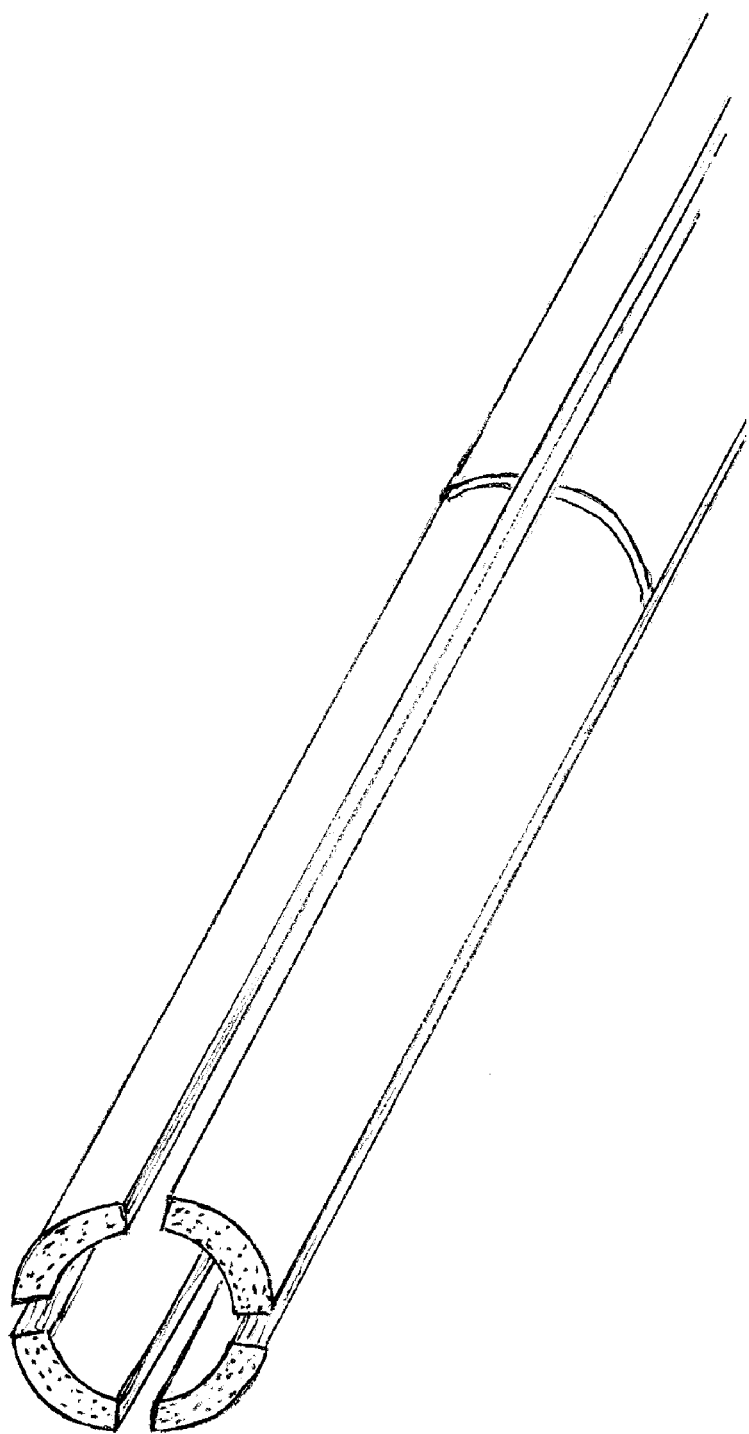
FIG. 3 is a view of a stalk being split into uniform dimensions.
Figures 4, 5:
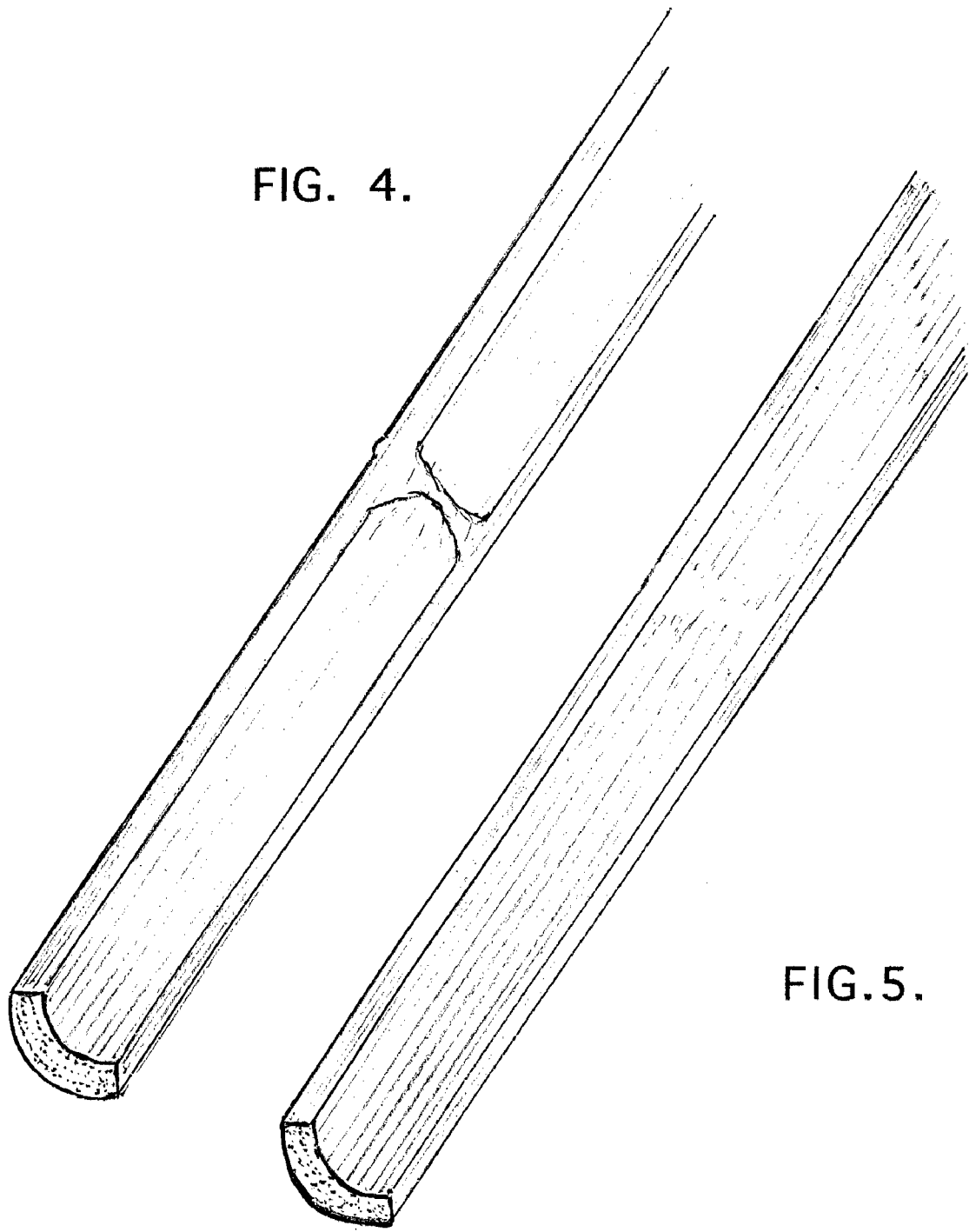
FIG. 4 reveals an inner knuckle or joint to be removed from stalk.
FIG. 5 illustrates an inner knuckle or joint removed during process.

The next step is to send a splitting device down the center of the stalk, which will generally have four tapered knifes (resembling a Phillips head bit), but may have as many as eight knives depending of the diameter of the stalk (see FIG. 2). This process ensures that the stalk is divided into uniform divisions. The number of knives and the diameter of the splitting device will depend on the diameter of the stalk to which the splitting device is introduced. Once the splitting device is introduced into the material, the *Arundo donax* or bamboo will divide along the linear grain in the stalk and split quite easily (see FIG. 3). At this stage, the inner knuckles or joints (see FIG. 4) are removed by grinding (see FIG. 5).

Figures 6, 7:
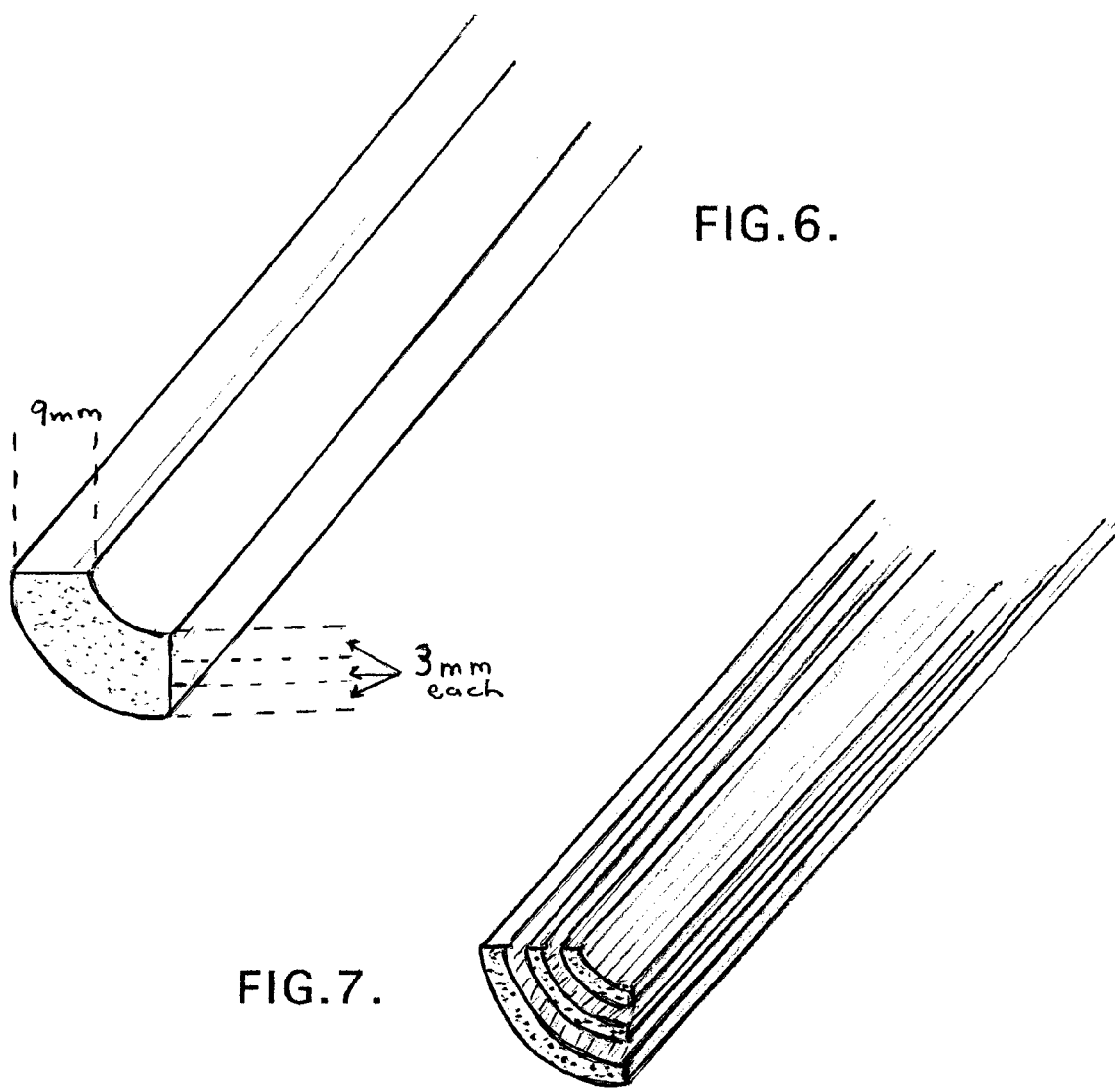
FIG. 6 typifies the average dimensions of the stalk wall.
FIG. 7 represents inner walls of the stalk peeled along its grain line.

Depending on the diameter of the stalk, the thickness of the stalk walls will typically be between 3 mm and 9 mm. Materials for processing *Arundo donax* or bamboo plywood utilizing this method are preferably 3 mm in thickness. Stalks of a greater thickness will then be split into two to three sections, each approximately 3 mm thick (see FIG. 6 and FIG. 7). Like splitting the stalk above, the layers of thickness also have a grain such that once split with a knife on one end, the layer will continue to peel in relatively uniform dimensions. Precision at this stage is not required as any irregularity will be corrected later on during the board production process.

The next step involves weaving the split *Arundo donax* or bamboo stalk sections perpendicularly into mat-like sheets employing one of several techniques, including mechanical processes currently used in many developing countries for weaving perennial grasses to make hand-held fans, screens (for room dividers) and floor mats (see FIG. 8). The natural grain of the *Arundo donax* or bamboo sections woven at 90 degree angles will produce an inherently perpendicularly-oriented-strand mat.

Figure 10:
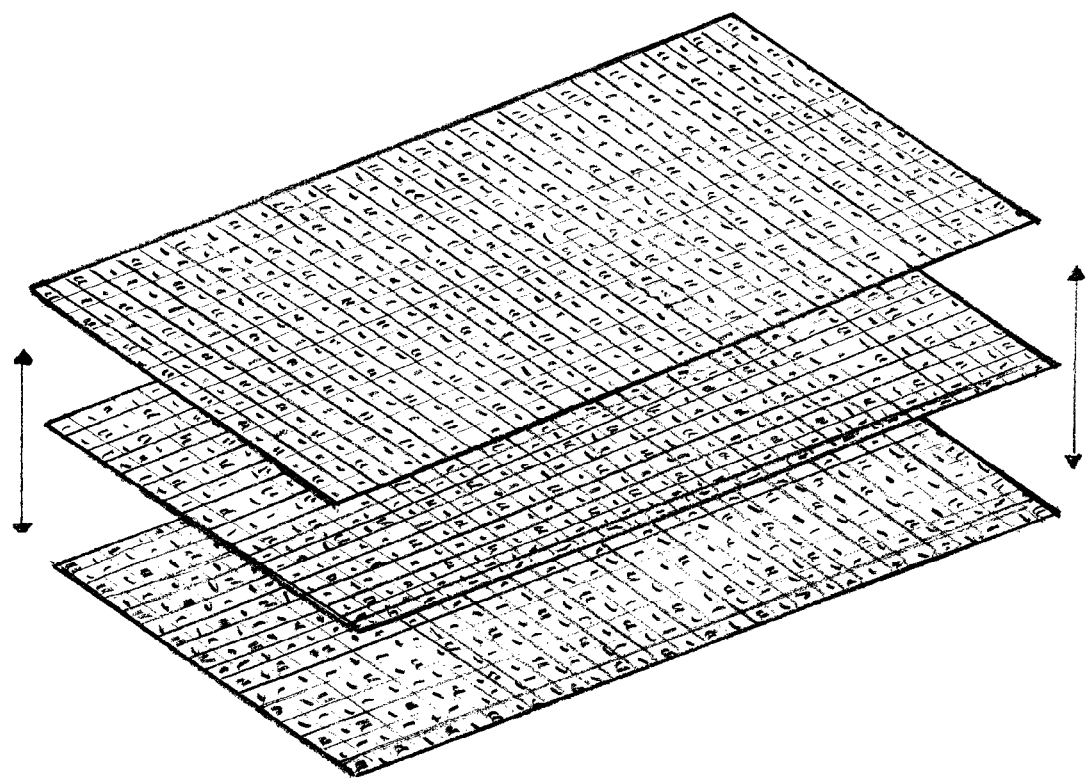
FIG. 10 illustrates the plies of mat being layered before the press.

Additionally, the weaving of the *Arundo donax* or bamboo sections breaks the flat plane, adding a third dimension producing a three-dimensionally-oriented-strand layered mat (see FIG. 9). Several woven mat sheets, typically 3 to 12 (the number of sheets depending on intended use for the end product and the desired thickness for the finished material) are then laminated with other woven mat sheets (see FIG. 10).

Figure 11:
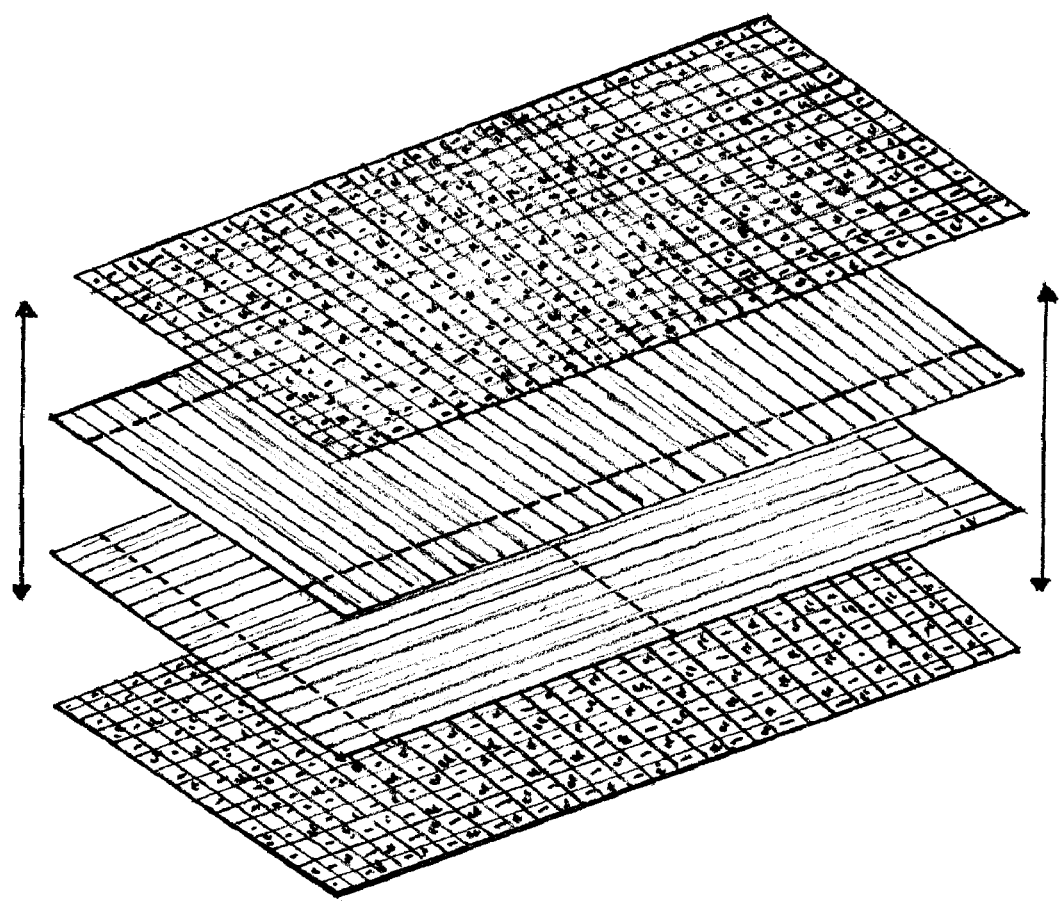
FIG. 11 shows two sheets of unwoven fiber strands being placed between woven mats for use as a strengthening core in the laminated product.
Figure 12:
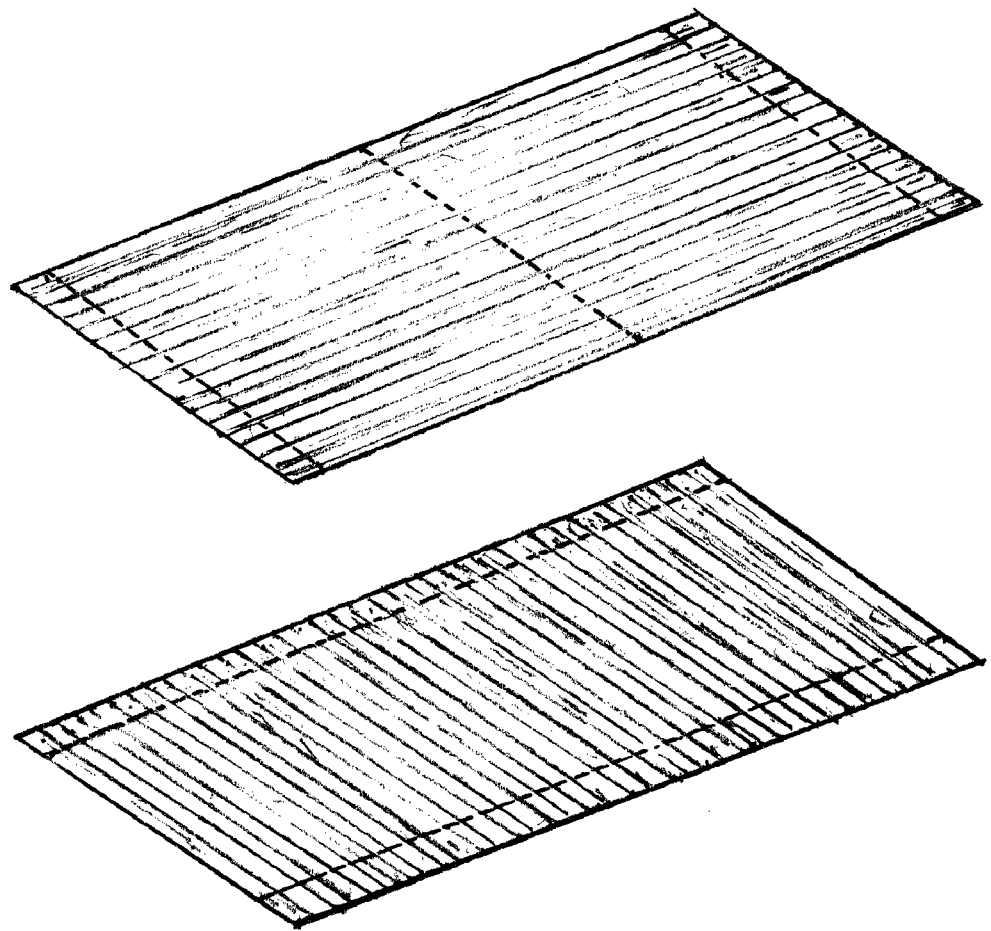
FIG. 12 details string being utilized to bind the parallel, unwoven stalks together in sheets for use as a strengthening core as shown in FIG. 11.

To enhance the performance of the finished structural products in terms of their resistance to compression when stood on edge, a core of unwoven fiber strands of equal dimension to the woven strands may be added running the length and width of the board perpendicular to each other, thereby improving the products load bearing capabilities (see FIG. 11). The parallel pieces are held together by cotton string looped around each strand approximately 6 inches from the edge of the strands. When the strands are eight feet long, a third cotton string is looped around each strand at the four foot center (see FIG. 12). The unwoven core sheets are bonded to the woven sheets and to each other in the same manner as the woven sheets are bonded together.

All of the above procedures must be performed with the *Arundo donax* or bamboo stalk in a freshly cut, green state; when the material ages, it dries out and becomes less pliant.

The materials used to bind the layers of woven mat can be any one of several commercial resins currently used in the board production industry today or one of the newly developed resins as the materials evolve. Some natural resins that may be utilized are soy, lignin, furfural, and natural phenolics.

A significant feature of the present invention, specific to the layer binding process, is to add nano-science materials (specifically potash) to the resin material which binds the woven mats in order to enhance the desired end-product's fire retardant qualities. The percentage of potash mixed into the resin should be between one and ten by volume, with the preferred range of five to six percent. The enhanced-resins materials will then be applied to the woven mat utilizing any one of several glue spreaders used in the wood board production industry.

The woven mats are layered and pressed with resin materials between each sheet under a pressure of 150 psi to 250 psi, depending on the intended use for desired end-product.

The board product will initially be manufactured in dimensions as large as conventional pressing equipment for wood board products allows. Nevertheless, inherent to the weaving process is the ability to continuously press layered mats into structural board with the only limitation being the ability to transport large dimensioned materials to a desired location. The thickness of the finished product will typically vary from approximately ¼ inch (or 6 mm) to one inch (or 26 mm).

Figure 13:
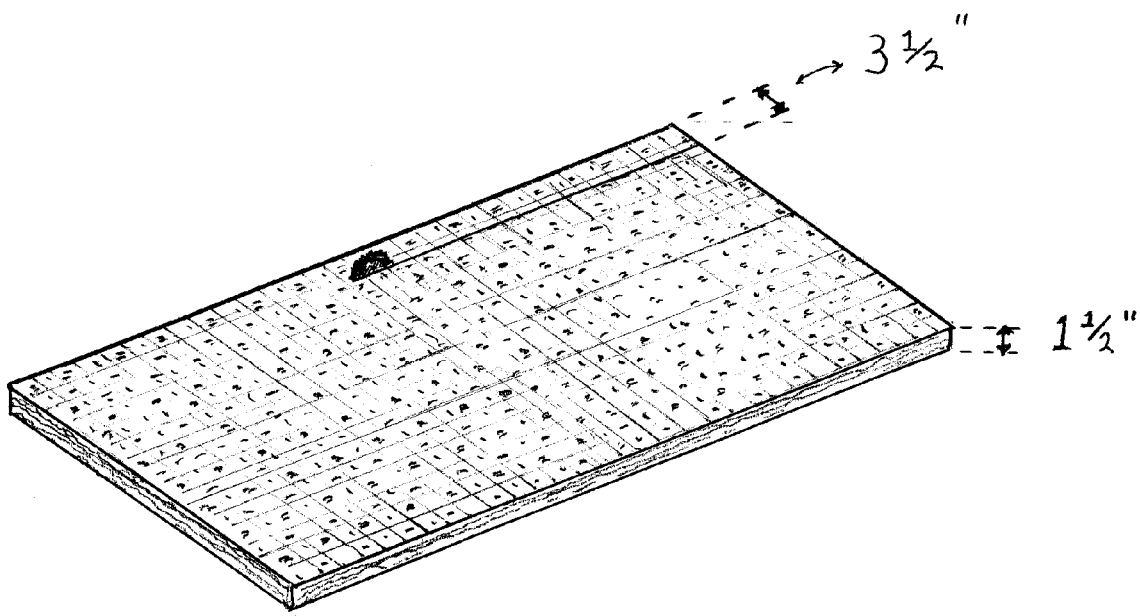
FIG. 13 depicts 1½" plywood being cut into dimensional lumber.
Figure 14:
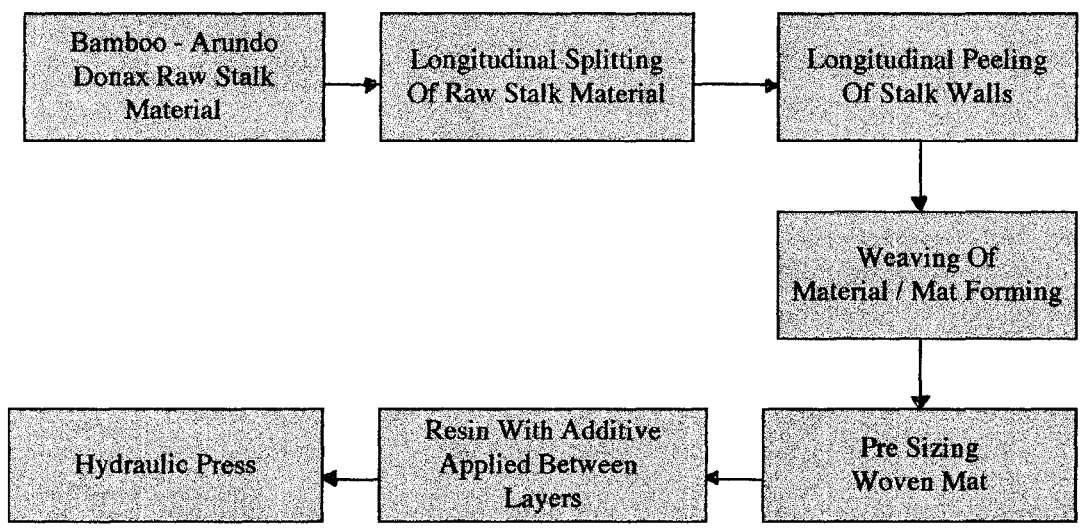
FIG. 14 is a schematic flow diagram showing the process of the invention.

¾ inch thickness are laminated together, producing a structural material 1½ inch thick, the newly-dimensioned board material can then be cut in various widths to produce dimensional lumber products such as the standard American 2×4 because 2×4's are typically 1½" thick (see FIG. 13). In Europe, board presses now exceed 14 meters (45.9 feet). Equipment such as this would enable dimensional lumber production such as 2×4's progressing in 2 inch increments (2"×6", 2"×8" 2"×10", etc.) from *Arundo donax* and bamboo over 40 feet in length. Three-dimensional-oriented-strand lumber would be the first of such products to be manufactured anywhere in the world.

*Arundo donax* and bamboo plywood and dimensional lumber can be efficiently produced using the above described method for applications in the general building construction industry both in the United States and in developing countries. Within the United States, the environmental movement is pushing strongly for "green alternatives" for building construction materials. Structural board and dimensional lumber produced from *Arundo donax* or various strains of bamboo, using this cost efficient method, provide an opportunity for a "totally green" building system.

Currently, many developing countries recognize that they will not be able to solve mounting housing shortages unless they adopt modem building technologies. With a little education, *Arundo donax* and bamboo plywood may become highly desirable to global markets in part due to the product's high structural merit. Adding to the structural qualities that are inherent to the natural *Arundo donax* and bamboo fiber itself is the innovation of weaving the split stalks in such a way that the strands of the fiber within the split stalks of each woven mat are essentially systematically oriented three-dimensionally (length, width and depth) as the weaving of the long stalk fiber breaks the flat plane of conventional layering.

Due to this method of orienting strands three-dimensionally, unlike methods used for conventional wood processing, finished products need not be designed for an odd number of layered sheets or plies. Therefore the number of plies may optimally range from two to twelve depending on the desired thickness and intended use for the finish product. Whereas conventional wood technology calls for an odd number of sheets or plies such that the outer skins are consistent with each other in terms of strand orientation, every layer of the three-dimensional woven mat of the present invention is consistent.

By virtue of the strands being pre-connected integrally prior to the binding process, the resultant mechanical properties after lamination such as bending strength, tensile strength parallel to the surface, tensile strength perpendicular to the surface (internal bond), screw holding strength and nail holding strength will be greatly enhanced.

Additionally, many bamboo plants, as well as *Arundo donax* Ligneous (which is preferred by the inventors for plywood production), are known to have fibers that are twice as strong as the fibers of the soft woods traditionally used in the plywood production industry. The inventors further contemplate a finished material with a higher shear strength in the plane of the board and a finished product 25% lighter in weight than comparably dimensioned plywood made from soft woods.

A lighter weight product opens many other marketing opportunities outside of the building construction area. For instance, a product as described above, having the added features of being highly resistant to moisture and virtually fireproof, would be greatly appealing to the marine industry. The inventors contemplate the product's application to the aviation industry as well. Because the present invention does not require the addition of odorous and toxic materials to artificially enhance its moisture-and fire-resistance, the laminate furniture industry will likely be most receptive to *Arundo donax* and bamboo plywood.

The ultimate product is designed as a structural board and as dimensional lumber components to be used in building construction. *Arundo donax* and bamboo plywood may also be used in the manufacture of other engineered building products such as I-beams, laminate beams, roof trusses and materials for forming concrete.

It may also be used for other construction purposes that are not structural in nature and as a material for various other industries where it may be found beneficial.

*Arundo donax* and bamboo plywood may be used as non-structural panels for wall dividers, temporary dividers, cabinets countertops, cutting boards, furniture, shelving, tabletops, packaging and crates, pallets, windows frames, furring materials, exterior sidings, interior and exterior doors, underlayments, sheathing, ceiling materials, finish flooring, and panels for decoration.

What is claimed is:

1. A method for making plywood, comprising the steps of:
   (a) providing a plurality of freshly cut stalks of *Arundo donax* L. or bamboo;
   (b) removing green husk and leaves from each of said stalks from step (a);
   (c) longitudinally splitting each of said stalks into a plurality of longitudinal pieces;
   (d) peeling inner walls and removing knuckles from said longitudinal pieces;
   (e) peeling said longitudinal pieces into longitudinal sections with a thickness substantially the same as a predetermined thickness;
   (f) weaving said longitudinal sections perpendicularly into woven mat-like sheets;
   (g) cutting the woven mat-like sheets into a predetermined dimension; and
   (h) bonding together a predetermined number of woven mat-like sheets of a predetermined dimension from (g), one layer on top of another, by applying an adhesive between the woven mat-like sheets and pressing them into a block of plywood, wherein the adhesive comprises a resin and potash.

2. The method for making plywood as claimed in claim 1, wherein all the stalks provided in step (a) are stalks of *Arundo donax* L.

3. The method for making plywood as claimed in claim 2, wherein the pressing is performed under a pressure of 150-250 psi.

4. The method for making plywood as claimed in claim 3, wherein the resin is selected from the group consisting of soy, lignin, furfural and natural phenolics; and the adhesive contains 1 to 10% potash by volume.

5. The method for making plywood as claimed in claim 4, wherein the adhesive contains 5 to 6% potash by volume.

6. The method for making plywood as claimed in claim 4, wherein the predetermined thickness of the peeled longitudinal sections in step (e) is 3 mm.

7. The method for making plywood as claimed in claim 4, wherein the block of plywood from step (h) is substantially ½ inch (0.5") or 1½ inch (1.5") thick.

8. The method for making plywood as claimed in claim 7, further comprising:
(i) cutting the block of plywood into standard-width dimensional blocks of plywood, wherein the standard width is 3½", 5½", 7 ½", 9½", or 11½".

9. The method for making plywood as claimed in claim 4, wherein a first and a second unwoven layers of longitudinal sections from step (e) are placed between two of the predetermined number of woven mat-like sheets in step (h) to be bonded and pressed together into the block of plywood, wherein
the longitudinal sections are aligned longitudinally in the first unwoven layer; and
the longitudinal sections in the second unwoven layer are aligned perpendicularly to the longitudinal sections of the first unwoven layer.

10. The method for making plywood as claimed in claim 9, wherein the predetermined thickness of the peeled longitudinal sections in step (e) is 3 mm.

11. The method for making plywood as claimed in claim 9, wherein the block of plywood from step (h) is substantially ½ inch (0.5") or 1½ inch (1.5") thick.

12. The method for making plywood as claimed in claim 11, further comprising:
(i) cutting the block of plywood into standard-width dimensional blocks of plywood, wherein the standard width is 3½", 5½", 7½", 9½", or 11½".

13. The method for making plywood as claimed in claim 1, wherein at least a portion of the stalks provided in step (a) are bamboo stalks.

14. The method for making plywood as claimed in claim 13, wherein the pressing is performed under a pressure of 150-250 psi.

15. The method for making plywood as claimed in claim 14, wherein the resin is selected from the group consisting of soy, lignin, furfural and natural phenolics; and the adhesive contains 1 to 10% potash by volume.

16. The method for making plywood as claimed in claim 15, wherein the adhesive contains 5 to 6% potash by volume.

17. The method for making plywood as claimed in claim 15, wherein the predetermined thickness of the peeled longitudinal sections in step (e) is 3 mm.

18. The method for making plywood as claimed in claim 15, wherein the block of plywood from step (h) is substantially ½ inch (0.5") or 1½ inch (1.5") thick.

19. The method for making plywood as claimed in claim 18, further comprising:
(i) cutting the block of plywood into standard-width dimensional blocks of plywood, wherein the standard width is 3½", 5½", 7 ½", 9½", or 11½".

20. The method for making plywood as claimed in claim 15, wherein a first and a second unwoven layers of longitudinal sections from step (e) are placed between two of the predetermined number of woven mat-like sheets in step (h) to be bonded and pressed together into the block of plywood, wherein
the longitudinal sections are aligned longitudinally in the first unwoven layer; and
the longitudinal sections in the second unwoven layer are aligned perpendicularly to the longitudinal sections of the first unwoven layer.

* * * * *